J. WHEELER.
Harrows.
No. 154,308. Patented Aug. 18, 1874.
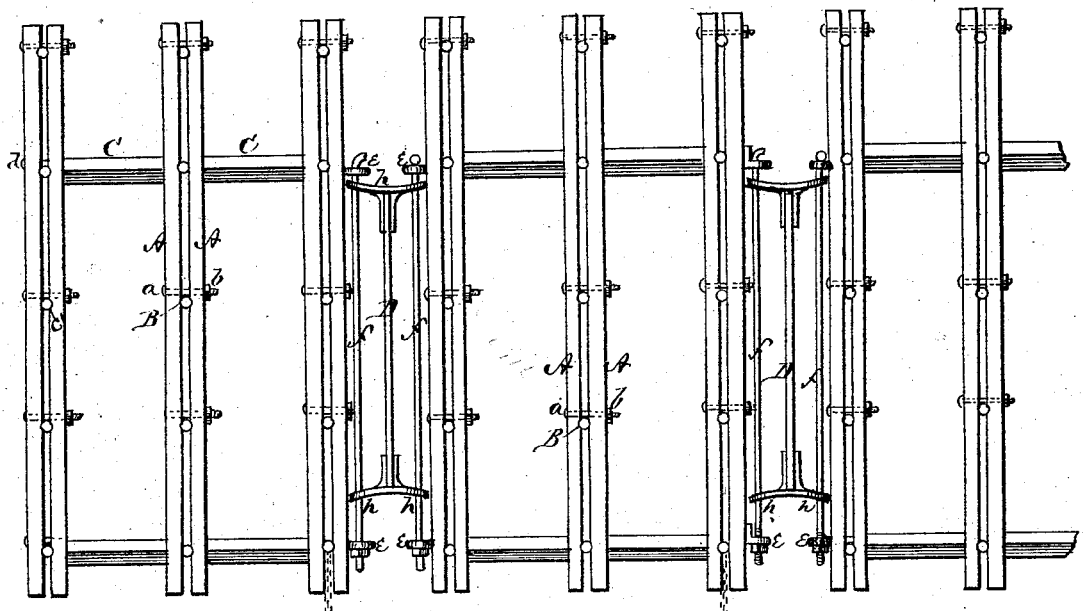
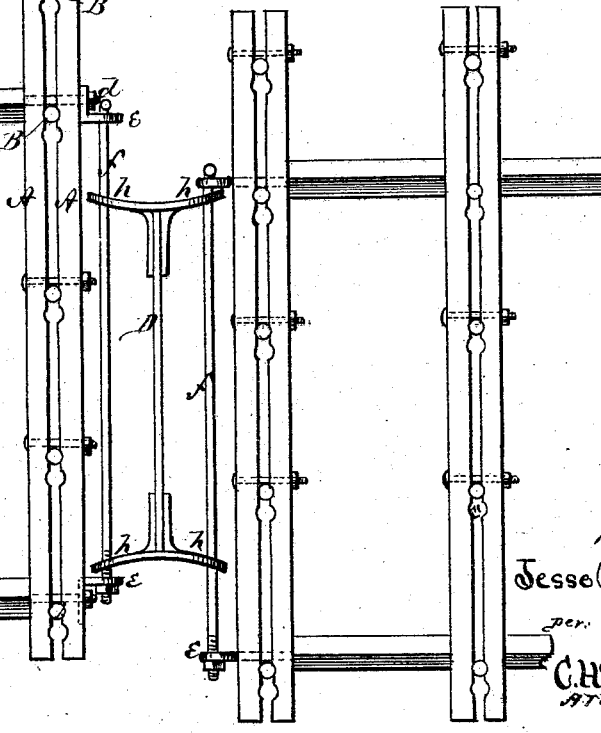
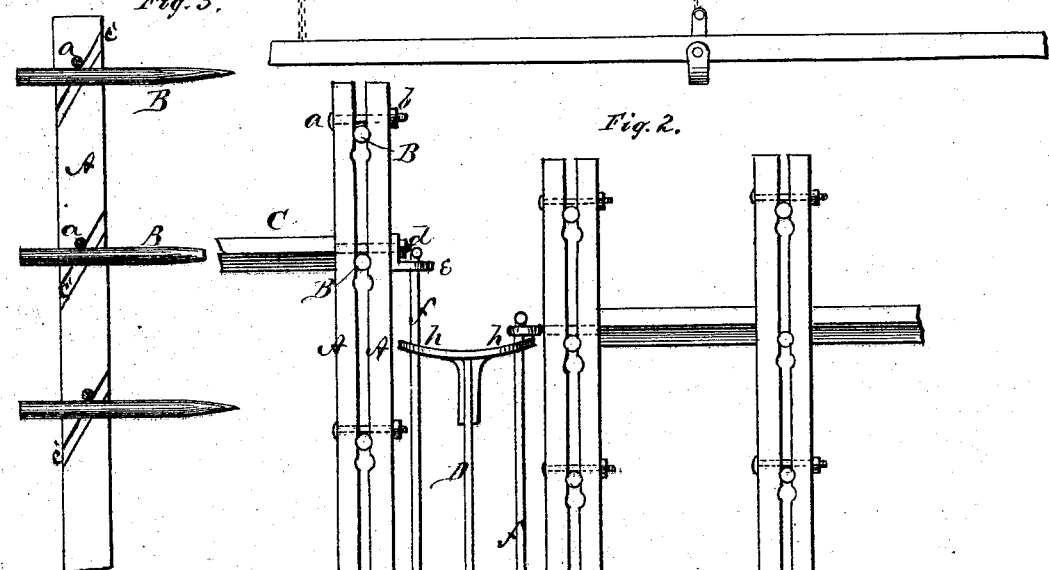

UNITED STATES PATENT OFFICE.

JESSE WHEELER, OF BROWNSVILLE, MISSOURI, ASSIGNOR TO HIMSELF, ANDREW J. HIBBS, AND SAMUEL H. HUSTON.

IMPROVEMENT IN HARROWS.

Specification forming part of Letters Patent No. 154,308, dated August 18, 1874; application filed June 20, 1874.

*To all whom it may concern:*

Be it known that I, JESSE WHEELER, of Brownsville, in the county of Saline and State of Missouri, have invented certain new and useful Improvements in Harrows; and I do hereby declare that the following is a full, clear, and exact description thereof, which will enable others skilled in the art to which it pertains to make and use the same, reference being had to the accompanying drawings and to the letters of reference marked thereon, which form a part of this specification.

The nature of my invention consists in the construction of a harrow with adjustable teeth so secured between two parallel bars that they may be set at right angles or at any inclination to the bars at pleasure, the teeth being placed in angular grooves $c'$, said grooves being on an angle to the line of draft, and at such angles as it may be desired to have the teeth set, thus holding the teeth firmly in position in the grooves $c'$, between the parallel bars A. It also consists in the construction of a hinge or coupling for uniting the sections of the harrow together, so that the sections will have both an up and down and a backward and forward motion, all as hereinafter more fully set forth.

In the accompanying drawing, Figure 1 is a plan view of a sectional harrow embodying my invention. Fig. 2 is an enlarged plan view of a part thereof, and Fig. 3 is a section of the same.

The harrow represented in the drawing is composed of three sections, and each section is formed of three pairs of parallel bars, A A, between which the teeth B B are clamped by means of screw-bolts $a$ $a$, one for each tooth, and nuts $b$ on the ends of said bolts. By this means the teeth may be fastened securely in any position by tightening the nuts, or their position changed by simply loosening the nuts, and when the teeth are adjusted tightening the nuts again. The same object may be accomplished by means of a rod, $d$, and brace C, for each row of teeth.

In the application of this part of my invention I do not confine myself to a sectional harrow, as it may be used in a harrow of any construction.

The sections of the harrow are coupled together by the following means: Each section has on its inner side two eyes or loops, $e$ $e$, through which a rod, $f$, passes. This rod also passes through the ends of two arms, $h$ $h$, extending at right angles from the ends of a bar, D, or at any inclination desired. The bar D has two of these arms on each side, so as to form the coupling connecting two sections of the harrow together. This bar is shorter than the distance between the eyes $e$ $e$, and hence the sections will have a vibratory motion backward and forward, as well as flexibility to allow them to adapt themselves to the surface of the ground over which they pass.

Having thus fully described my invention, what I claim as new, and desire to secure by Letters Patent, is—

1. The parallel bars A, with the grooves $c'$ upon different angles, in combination with the teeth B, bolts $a$, and nuts $b$, all as and for the purpose set forth.

2. In a sectional harrow, the bar D, with curved perforated arms $h$, in combination with rods $f$ and eyes $e$, all constructed and arranged as and for the purpose specified.

In testimony that I claim the foregoing as my own I affix my signature in presence of two witnesses.

JESSE WHEELER.

Witnesses:
R. L. FERGUSON,
JAS. H. FERGUSON.